United States Patent
Chang et al.

(10) Patent No.: US 7,058,777 B2
(45) Date of Patent: Jun. 6, 2006

(54) MICROCONTROLLER DEVICE FOR EXTENDING MEMORY ADDRESS BY INSERTING A WAITING STATE AND THE OPERATION METHOD FOR THE DEVICE

(75) Inventors: Sheng-Tsai Chang, Changhua Hsien (TW); Chao-Wen Chi, Hsinchu (TW)

(73) Assignee: Winbond Electronics Corp., Hsinchu (TW)

( * ) Notice: Subject to any disclaimer, the term of this patent is extended or adjusted under 35 U.S.C. 154(b) by 295 days.

(21) Appl. No.: 10/604,796

(22) Filed: Aug. 18, 2003

(65) Prior Publication Data

US 2004/0225851 A1   Nov. 11, 2004

(30) Foreign Application Priority Data

May 5, 2003   (TW) .............................. 92112208 A

(51) Int. Cl.
*G06F 12/00*   (2006.01)

(52) U.S. Cl. ..................... 711/167; 711/2; 711/102; 711/104; 710/57

(58) Field of Classification Search ................ 711/1–3, 711/101–105, 111–115, 167; 712/1, 38, 712/43
See application file for complete search history.

(56) References Cited

U.S. PATENT DOCUMENTS

| | | | | |
|---|---|---|---|---|
| 5,329,621 A * | 7/1994 | Burgess et al. | ............. | 710/107 |
| 5,465,343 A * | 11/1995 | Henson et al. | ............. | 711/112 |
| 5,668,971 A * | 9/1997 | Neufeld | .................. | 711/111 |
| 6,240,504 B1 * | 5/2001 | Boutaud et al. | ............. | 712/38 |
| 6,343,353 B1 * | 1/2002 | Kim | ......................... | 711/167 |
| 2003/0233527 A1 * | 12/2003 | Kawasaki et al. | ............. | 712/1 |

* cited by examiner

*Primary Examiner*—Donald Sparks
*Assistant Examiner*—Hashem Farrokh
(74) *Attorney, Agent, or Firm*—Jiang Chyun IP Office

(57) ABSTRACT

A microcontroller device for extending memory address space by inserting a waiting state and an operation method on the device. The device includes a CPU, a ROM, and a memory interface controller. In the device, the memory interface controller inserts a waiting state into the CPU when address of the information or the program to be fetched by the CPU is not located within a predetermined address range until the information or the program is completely fetched.

7 Claims, 4 Drawing Sheets

MICROCONTROLLER DEVICE FOR EXTENDING MEMORY ADDRESS BY INSERTING A WAITING STATE AND THE OPERATION METHOD FOR THE DEVICE

CROSS REFERENCE TO RELATED APPLICATIONS

This application claims the priority benefit of Taiwan application Ser. No. 92112208, filed May 05, 2003.

BACKGROUND OF INVENTION

1. Field of Invention

The present invention relates to a device of address space and the operation method on the device. More particularly, the present invention relates to a device for extending the address space by inserting a waiting state and the operation method on the device.

2. Description of Related Art

Currently, the technology on computer information science has been greatly developed. Various information storage cartridges have been accordingly developed, such as tape cartridge, disk cartridge, optical disc cartridge, memory cartridge, read-only memory cartridge, and so on. Various types of information can be stored in those cartridges, such as information, program, voice, or music. The conventional bus used between the external memory cartridge and the micro-controller has two types, including parallel bus and serial bus.

Referring to FIG. 5, it is a circuit block diagram, schematically illustrating an interface device using parallel bus. In FIG. 5, the device is a micro-controller 510, which is coupled to the external memory 150 through the parallel bus 540. Wherein, the micro-controller 510 includes a central processing unit (CPU) 512 and a read-only memory (ROM) 514. When the address of the information or the program to be executed by the CPU 512 is located at the external memory 150, the CPU 512 accesses the external memory 150 through the parallel bus 540. The interface of communication path between the micro-controller 510 and the external memory 150 is the parallel bus 540, so that the broadband request is necessary for the micro-controller 510 to access the information or the program from the external memory 150. However, the parallel interface has the disadvantage that the number of connection pins of the micro-controller 510 should be sufficient large for satisfying the broadband request, and it results in the increase of fabrication cost.

Referring to FIG. 6, it is a circuit block diagram, schematically illustrating a conventional serial address interface device having decoder. The interface device is a micro-controller 610, which is coupled to the external memory 150 through the serial bus 640. Wherein, the information or program to be executed by the CPU 512 is located at the external memory 150, the serial bus 640 is used to access the external memory 150. When the serial bus 640 is smaller than the bus of the ROM 514, all of the information or the program, stored in the external memory 150, are treated as the information during accessing stage. After the program, which has been treated as an information, is accessed to the micro-controller 610, it needs the decoder 516 to decode it by a script language, so as to recover the original program. Even though the serial address interface device of FIG. 6 can improve the parallel address interface device of FIG. 5 about reducing the fabrication cost, the serial address interface device of FIG. 6 still has several disadvantages as follows:

(1) The conventional serial address interface device needs the script language to decode the accessed information, and it takes a lot of time to pre-build up the needing script language. (2) The conventional serial address interface device occupies at least a portion of memory resource of ROM/RAM during the decoding process.

SUMMARY OF INVENTION

The invention provides a microcontroller device for extending memory address space by inserting a waiting state, so that when the device (micro-controller) is using the bus, there in no need of decoder. The resource of the micro-controller and the fabrication cast can be saved. In addition, the variable program can be stored in the external memory, so as to simplify the ROM.

The invention provides a microcontroller device for extending memory address space by inserting a waiting state, wherein the invention arranges the memory interface controller to insert a waiting state to time CPU, when the CPU intends to execute a first program instruction of the external memory.

The invention provides an operation method on a microcontroller device for extending memory address space by inserting a waiting state. The method includes inserting a waiting state to the clock signal of the CPU when the address of the program instruction to be accessed is located our of a predetermined address range. The state is not changed until the program instruction is completely fetched.

The invention provides a microcontroller device for extending memory address space by inserting a waiting state. The device includes a ROM, a CPU, and a memory interface controller. Wherein, the device is a micro-controller and is coupled to an external memory, which has stored a first program, through a bus.

According to the invention, the foregoing ROM also stores a second program. The CPU is used to execute the first program and the second program. In the foregoing memory interface controller, when the CPU intends to execute the instructions of the first program stored in the external memory, the CPU is inserted with a waiting state.

According to the invention, the memory interface controller in the device includes a memory interface, a range checking unit, and a state control unit. In the foregoing range checking unit judges whether or not the address of the information, which is to be accessed by the CPU, is located within a predetermined range, and a range checking signal is selectively issued. When the state control unit receives the range checking signal, then a waiting state is inserted into the CPU. Wherein, when the range checking unit determines that the address of the information to be accessed by the CPU is located within an address range of the external memory or located out of an address range of the ROM, the range checking signal is issued.

According to the invention, the device can also work at the inquiry mode. At this mode, the memory interface controller further includes a buffer and a ready flag. The buffer temporarily stores the accessed information from the external memory through the bus. Wherein, the buffer includes several registers, which can store at least one bit. The ready flag is inquired by the CPU. When the buffer has correctly accessed the information of the external memory through the memory interface, the CPU then correctly accesses the information from the buffer.

Wherein, when the CPU sets the memory interface as the inquiry mode, the state control unit does not insert the waiting state into the CPU, and then the memory interface controller is activated by executing a reading-memory instruction.

According to the invention, the accessed information during the inquiry mode includes voice information or music information.

According to the invention, the transmission between the external memory and the memory interface controller uses a serial transmission, and the information transmission unit between them in one time is one bit, two bits, one nibble or one byte.

The invention provides an operation method on a micro-controller device for extending memory address space by inserting a waiting state. The operation method includes, first, setting a predetermine address range for the device. A memory interface controller judges whether or not an address of a program instruction, which is to be fetched, is located within the predetermined address range. If the memory interface controller judges that the address of the program instruction, which is to be fetched, is located out of the predetermined address range, the memory interface controller inserts a waiting state into the CPU, so that the clock state of the CPU is not changed until the program instruction is completely fetched. Otherwise, if the memory interface controller judges that the address of the program instruction, which is to be fetched, is located within the predetermined address range, the CPU directly fetches the program instruction. The CPU then executes the program instruction being fetched, and repeating the foregoing process until the execution is stop.

Since the invention uses the device of extending the memory address space by inserting a waiting state, when the device (micro-controller) is coupled to the bus of external memory, the serial bus can be used. The serial bus can reduce the number of connection pins of the device, so that the decoder is not necessary to be implemented. At the same time, the resource of micro-controller and the fabrication cost can be saved.

It is to be understood that both the foregoing general description and the following detailed description are exemplary, and are intended to provide further explanation of the invention as claimed.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION

Figure 1:
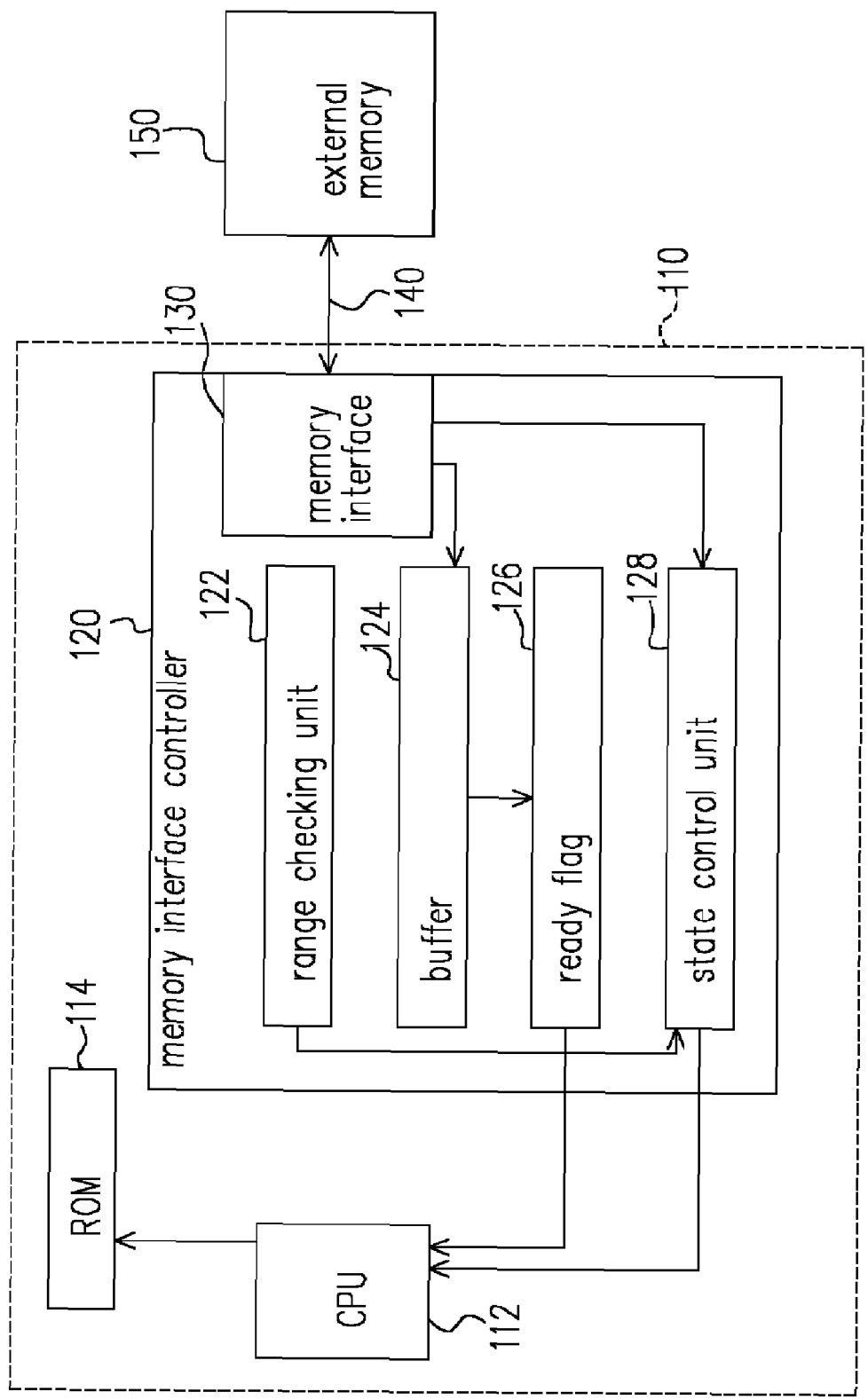
FIG. 1 is a circuit diagram, schematically illustrating a device for extending the address space by inserting a waiting state and an external memory, according to a preferred embodiment of the invention.

Referring to FIG. 1, it is a circuit diagram, schematically illustrating a device for extending the address space by inserting a waiting state and an external memory, according to a preferred embodiment of the invention. In FIG. 1, it has the device 110 for extending address space by inserting a waiting state, a bus 140, and an external memory 150. The device 110 for extending address space by inserting a waiting state is coupled to the external memory 150 through the bus 140. Wherein, as being well understood by skilled artisans, the device 110 for extending address space by inserting a waiting state can be a micro-controller, and the micro-controller can freely extend the clock. The bus 140 can be a serial bus. In addition, an information transmission quantity in one time between the device 110 for extending address space by inserting a waiting state and the and the external memory device 150 can be one bit, two bits, one nibble, or one byte.

In the embodiment, the external memory 150 at least stores a first program, wherein as well known by the skilled artisans, the first program can be a program written by the assembly language but not the only limit.

In the embodiment, the working state of the device 110 for extending address space by inserting a waiting state can be a waiting mode or an inquiry mode. For simple descriptions, the waiting mode is first described, then the inquiry mode is described later.

In FIG. 1, the device 110 for extending address space by inserting a waiting state includes a CPU 112, a ROM 114, and a memory interface controller 120. Wherein, as well known by skilled artisans, the CPU 112 can be the 6502 microprocessor but not limited to this. Further still, the memory interface controller 120 includes a range checking unit 122, a buffer 124, a ready flag 126, a state control unit 128, and a memory interface 130.

Referring to FIG. 1, the coupling relation in the device 110 for extending address space by inserting a waiting state is that the CPU 112 is coupled to the ROM 114, and the memory interface controller 120. The coupling relation in the memory interface controller 120 is that the range checking unit 122 is coupled to the state control unit 128. The buffer 124 is coupled to the ready flag 126 and the memory interface 130, the ready flag is coupled to CPU 112, and the state control unit 128 is coupled to the CPU 112 and the memory interface 130.

In the embodiment, during the waiting state, the range checking unit 122 first judges whether or not the address of the information to be accessed by the CPU is located with the predetermined range. When the judged result indicates that the address of the information is located within the address range of the external memory or out of the address range of the ROM 114, then a range checking signal is issued to the state controller 128. When the state controller 128 receives the range checking signal sent from the memory interface 130, the CPU 112 is inserted with a waiting state, wherein for example the waiting state can be inserted when the clock signal of the CPU 112 is at a logic high level.

Then, after the fetching action is complete, the waiting state inserted into the CPU 112 is removed.

In the embodiment, when the device 110 for extending address space by inserting a waiting state is at the inquiry mode, the memory interface controller 120 further includes a buffer 124 and a ready flag 126. Wherein, as well known by the skilled artisans, buffer 124 can include a number of registers. The registers can respectively store an information set of at least one byte, to form the buffer. However, this is not the only limitation.

When the device 110 is at the inquiry mode, the buffer 124 temporarily stores the information accessed from the external memory 150 through the bus 140. The CPU 112 is inquiring the ready flag, so that the CPU 112 can correctly access the correct information through the buffer 124 when the buffer 124 has correctly accessed the information from the external memory device 150 through the memory interface 130. Wherein, as well known by the skilled artisans, the information in inquiry mode can be a voice information or a music information but not limited to this voice.

In the embodiment, when the CPU 112 sets the device 110 for extending address space by inserting a waiting state as the inquiry mode, then the state control unit 128 does not insert a waiting state into the CPU 112, and the memory interface controller 120 is activated by executing a read memory instruction.

In the embodiment, during the inquiry mode, information can be fetched in full speed under the condition without affecting the executing speed of CPU.

Figure 3:
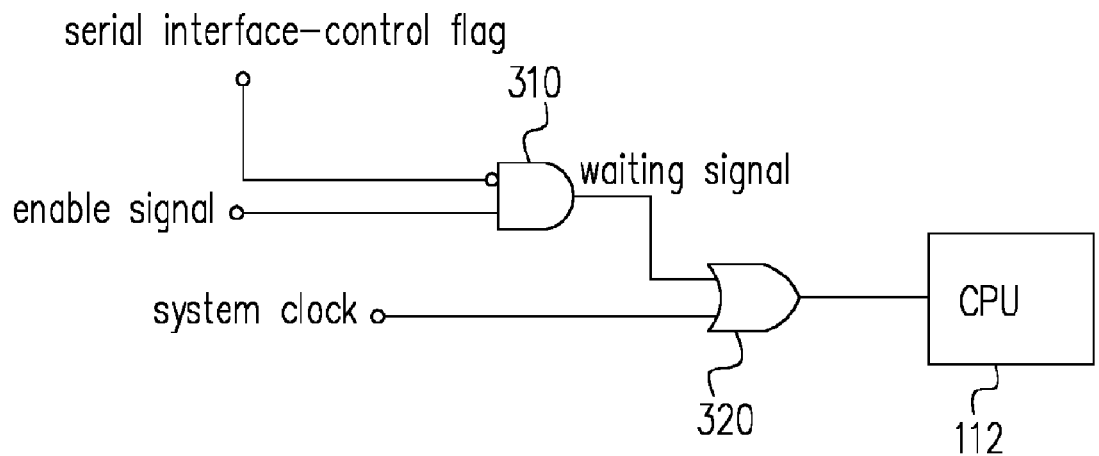
FIG. 3 is a circuit diagram, schematically illustrating state control unit, according to a preferred embodiment of the invention.
Figure 4:
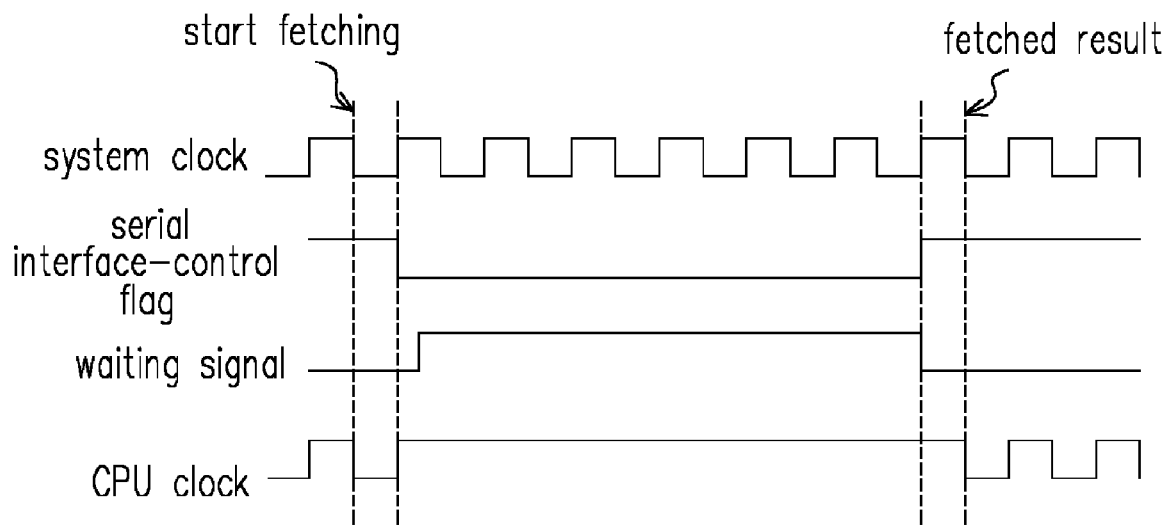
FIG. 4 is a timing train plot, schematically illustrating the time serial of the state control unit, according to a preferred embodiment of the invention.
Figure 5:
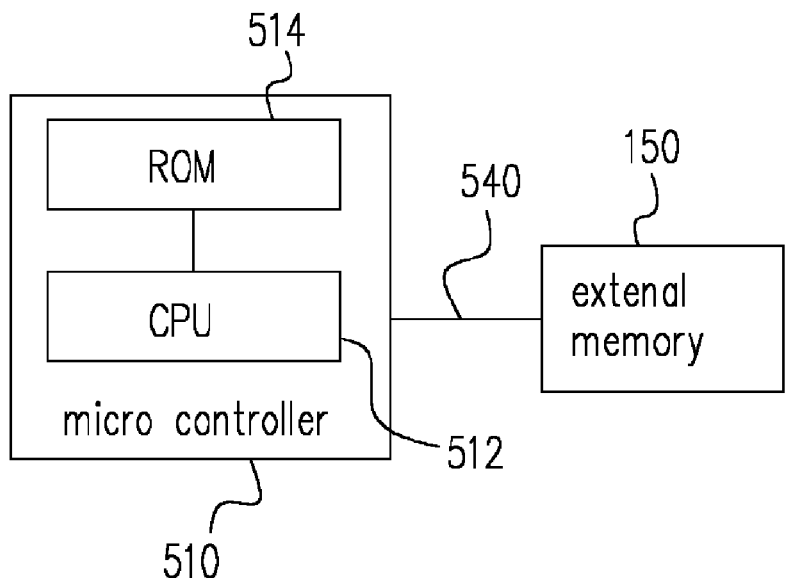
FIG. 5 is a circuit block diagram, schematically illustrating an interface device using parallel bus.
Figure 6:
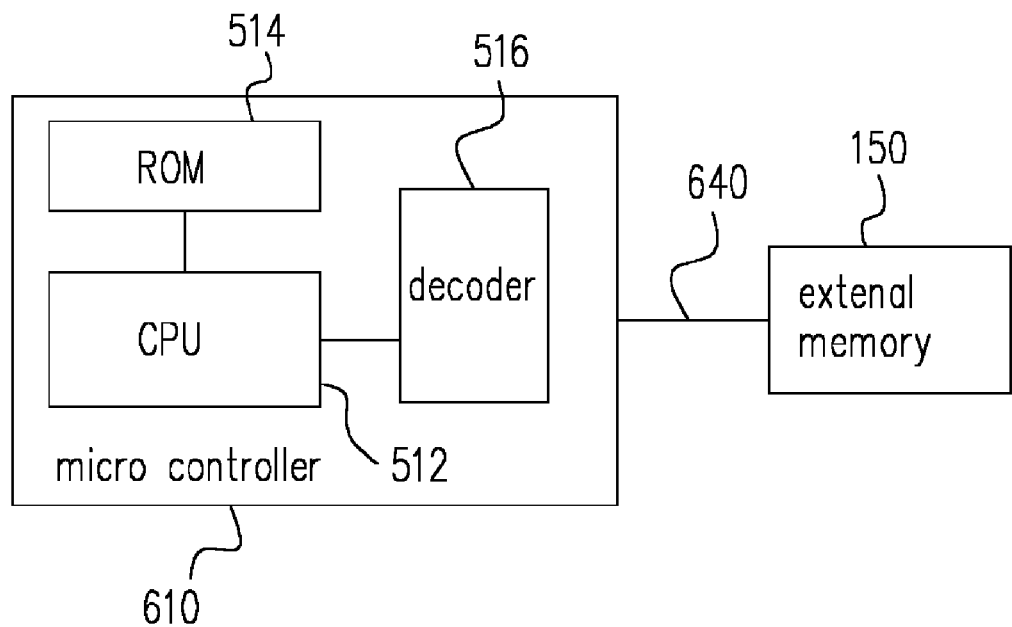
FIG. 6 a circuit block diagram, schematically illustrating another conventional serial address interface device having decoder.

Referring to FIG. 3 and FIG. 4, FIG. 3 is a circuit diagram, schematically illustrating state control unit 128, according to a preferred embodiment of the invention. FIG. 4 is a timing train plot, schematically illustrating the time serial of the state control unit 128, according to a preferred embodiment of the invention. In FIG. 3, the implemented circuit of the state control unit 128 includes an AND logic gate 310 for receiving a serial interface-control flag and an enable signal, a OR logic gate 320 for receiving a system clock and a waiting signal, and a CPU 112, such as the 6502 microprocessor, coupled to the OR logic gate 320. Wherein, the serial interface-control flag can be, for example, the range checking signal of the embodiment.

Referring to FIG. 3 and FIG. 4, wherein, when the device has confirmed the range checking, the serial interface-control flag is changed to a logic low level. When the serial information has been completely accessed, the serial interface-control flag is at the logic high level. The enable signal is at the logic high level for enabling when the device is at the waiting mode. When the device is at the inquiry mode, then the enabling signal is at the logic low level.

When the range checking has been confirmed, that is, when the address of information is judged to be located within the address range of the external memory device or out of the address range of the ROM, the serial interface-control flag is at logic low level. It is inverse before it is input to the AND logic gate 310, and becomes the logic high level. The enable signal input to the AND logic gate 310 is at the logic high level. Then, the output of the AND logic gate 310 as the waiting signal is at the logic high level. After the system clock is operated at the OR logic gate 320 with the waiting signal at the logic high level, a logic high level as the microprocessor clock is exported to the CPU 112. At this moment, the microprocessor clock remains at the logic high level without change.

When the device changes from the status of confirming the range checking to the status of completely accessing serial information, the serial interface-control flag changes from the logic low level to the logic high level. Before inputting to the AND logic gate 310, it is inverse, so that it is now at the logic low level. And, the enable signal input to the AND logic gate 310 is at the logic low level, then the output of the AND logic gate 310 as the waiting signal is at logic low level. Then, after the system clock and the waiting signal at logic low level are operated by the OR logic gate 320, the output as the microprocessor clock with the same phase as the system clock is input to the CPU 112. At this situation, the microprocessor clock then changes from the logic high level to have the same phase as the system clock.

Figure 2:
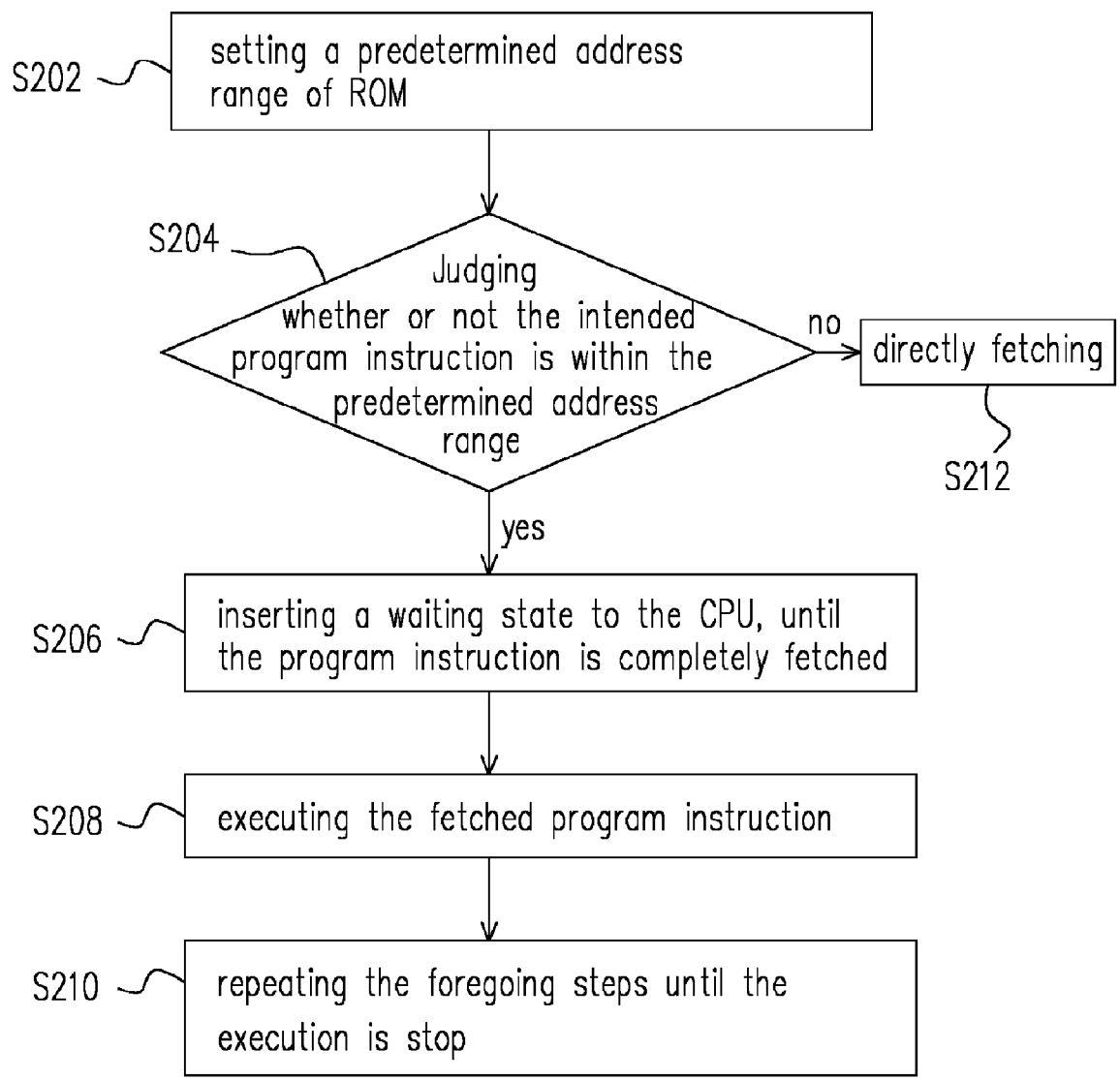
FIG. 2 is an operation flow diagram, schematically illustrating the method to extend an address space by inserting a waiting state, according to a preferred embodiment of the invention.

Referring to FIG. 2, it is an operation flow diagram, schematically illustrating the method to extend an address space by inserting a waiting state, according to a preferred embodiment of the invention.

In the embodiment, the operation method includes first setting a predetermined address range for the ROM, in step s202. In step s204, the memory interface-controller judges whether or not the address of the program instruction to be fetched is located within the predetermined address range. In step s206, if the memory interface controller has judged that the address of the program instruction to be fetched is located out of predetermined address range, the memory interface controller then inserts a waiting state into the CPU. The clock state of the CPU is not changed until the program instruction is completely fetched. On the contrary, in step s208 if the memory interface controller has judged that the address of the program instruction to be fetched is located within predetermined address range, the CPU then directly fetches the program instruction. Then, in step s208, the CPU executes the fetched program instruction. In step s210, the foregoing steps are repeatedly performed until the execution stops.

In summary, the device for extending address space by inserting a waiting state and the operation method on the device have following advantages.

(1) Since the device for extending address space by inserting a waiting state and the operation method use the serial bus, the connection pins of the micro-controller can be reduced to the minimum, and the fabrication cost is effectively reduced.

(2) The device for extending address space by inserting a waiting state and the operation method can store the program in, for example, the assembly language in the external memory, so as to simplify the ROM of the micro-controller.

(3) In the device for extending address space by inserting a waiting state and the operation method, the micro-controller needs not to be implemented with the decoder. The resource of the micro-controller can be saved.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

The invention claimed is:

1. A microcontroller device for extending memory address space by inserting a waiting state, wherein the device is coupled to an external memory through a bus, and the external memory has stored at least a first program, the device comprising:
 a read-only memory (ROM), for storing a second program;
 a central processing unit (CPU), coupled to the ROM for executing the first program or the second program; and
 a memory interface controller, for inserting a waiting state into the CPU when the CPU intends to execute an instruction of the first program stored in the external memory;

wherein the memory interface controller comprises:
a memory interface, coupled the bus, serving as a transmission interface between the memory interface controller and the bus;
a range checking unit, used to judge whether or not an address of an information, which is to be accessed by the CPU, is located within a predetermined range, and selectively issuing a range checking signal; and
a state control unit, coupled to the memory interface, the range checking unit, and the CPU, used for inserting the waiting state into the CPU when the range checking signal is received.

2. A microcontroller device for extending memory address by inserting a waiting state, wherein the device is coupled to an external memory through a bus, and the external memory has stored at least a first program, the device comprising:
a read-only memory (ROM), for storing a second program;
a central processing unit (CPU), coupled to the ROM, for executing the first program or the second program; and
a memory interface controller, for inserting a waiting state into the CPU when the CPU intends to execute an instruction of the first program stored in the external memory, wherein the memory interface controller comprises;
a memory interface, coupled the bus, serving as a transmission interface between the memory interface controller and the bus;
a range checking unit, used to judge whether or not an address of an information, which is to be accessed by the CPU, is located within a predetermined range, and selectively issuing a range checking signal;
a state control unit, coupled to the memory interface, the range checking unit, and the CPU, used for inserting the waiting state into the CPU when the range checking signal is received; wherein the device further comprising an inquiry mode, and the memory interface controller further comprising:
a buffer, coupled to the memory interface, for temporarily store the information accessed from the external memory through the bus; and
a ready flag, coupled to the buffer and the CPU, wherein the CPU inquires the ready flag, and the CPU correctly accesses the information through the buffer when buffer has correctly accessed the information of the external memory through the memory interface.

3. The device of claim 2, wherein when the CPU sets the device to the inquiry made, the state control unit does not insert the waiting state into the CPU, and memory interface controller is activated by executing a read memory instruction.

4. The device of claim 2, wherein the buffer includes a plurality of registers, the registers can store at least one byte information set.

5. The device of claim 2, wherein the accessed information by the inquiry mode includes voice information or music information.

6. The device of claim 2, wherein a transmission unit in one time is one bit, two bits, one nibble, or one byte.

7. An operation method on a microcontroller device for extending memory address by inserting a waiting state, wherein the device at least includes a central processing unit (CPU), the operation method comprising:
setting a predetermined address range;
judging whether or not an address of a program instruction to be fetched is located within the predetermined address range;
inserting a waiting state into the CPU when the address is located out of the predetermined address range, until the program instruction is completely fetched; and
executing the program instruction by the CPU, wherein the waiting state being inserted into the CPU cause a clock state of the CPU to remain.

* * * * *